US012798775B2

(12) United States Patent
Harris

(10) Patent No.: US 12,798,775 B2
(45) Date of Patent: Nov. 17, 2026

(54) TRAY TABLE WITH ELECTRONIC DEVICE POSITIONING APPARATUS

(71) Applicant: B/E Aerospace (UK) Limited, Leighton Buzzard (GB)

(72) Inventor: Adam Luke Harris, Leighton Buzzard (GB)

(73) Assignee: B/E AEROSPACE (UK) LIMITED, Leighton Buzzard (GB)

( * ) Notice: Subject to any disclaimer, the term of this patent is extended or adjusted under 35 U.S.C. 154(b) by 64 days.

(21) Appl. No.: 18/892,138

(22) Filed: Sep. 20, 2024

(65) Prior Publication Data

US 2025/0121939 A1 Apr. 17, 2025

(30) Foreign Application Priority Data

Oct. 11, 2023 (EP) .................................... 23202974

(51) Int. Cl.
*A47B 23/00* (2006.01)
*B64D 11/00* (2006.01)
*B64D 11/06* (2006.01)

(52) U.S. Cl.
CPC ................................ *B64D 11/0638* (2014.12)

(58) Field of Classification Search
CPC .......... B64D 11/0638; B64D 11/00152; B60N 3/004; B60N 3/002; B60N 3/001
USPC ..................................................... 108/42, 44
See application file for complete search history.

(56) References Cited

U.S. PATENT DOCUMENTS 5,443,018 A 8/1995 Cromwell
6,308,641 B1 * 10/2001 Kingbury ................ A47B 5/04 108/42
8,667,904 B2 3/2014 Pajic
9,156,555 B2 10/2015 Shih et al.
9,403,596 B2 * 8/2016 Pajic .................. B64D 11/0638
9,758,249 B2 * 9/2017 Zheng .................... A47B 13/16
(Continued)

FOREIGN PATENT DOCUMENTS

DE 102017201455 8/2018
EP 2981464 2/2016
(Continued)

OTHER PUBLICATIONS

European Patent Office; European Search Report dated Mar. 5, 2024 in Application No. 23202974.4.

*Primary Examiner* — Shin H Kim
(74) *Attorney, Agent, or Firm* — SNELL & WILMER L.L.P.

(57) ABSTRACT

A tray table for a passenger seat has a main body defining a table surface, and a first member configured to slide relative to the main body between a first position and a second, extended position, wherein in the second, extended position the first member is configured to define a first rest for supporting a first portion of an electronic device, and a second member configured to move relative to the main body between a first, stowed position and a second, extended position, wherein in the second position the second member protrudes upwardly from the table surface of the main body to define a second rest for supporting a second portion of an electronic device, and wherein the first member and the second member, when in their respective second, extended positions, thus cooperate to support and position an electronic device.

20 Claims, 7 Drawing Sheets

(56) References Cited

U.S. PATENT DOCUMENTS

| | | | | |
|---|---|---|---|---|
| 10,285,495 | B1 * | 5/2019 | Valme | A47B 13/081 |
| 10,363,854 | B2 | 7/2019 | Lamb et al. | |
| 10,919,426 | B1 * | 2/2021 | Campagnone | B60R 7/04 |
| 11,091,267 | B1 * | 8/2021 | Lawson | B64D 11/0605 |
| 11,305,876 | B2 * | 4/2022 | Wanner | B64D 11/0015 |
| 11,865,959 | B2 * | 1/2024 | Mansouri | F16M 11/041 |
| 12,534,207 | B2 * | 1/2026 | Rees-Gralton | B64D 11/0638 |
| 2007/0283855 | A1 | 12/2007 | Pozzi | |
| 2013/0093220 | A1 * | 4/2013 | Pajic | H02J 50/10<br>297/163 |
| 2017/0021931 | A1 * | 1/2017 | Stephens | B64D 11/0638 |
| 2017/0283067 | A1 * | 10/2017 | Darbyshire | B64D 11/0638 |
| 2018/0281968 | A1 * | 10/2018 | Daniel | B64D 11/0636 |
| 2019/0061953 | A1 | 2/2019 | Fishel et al. | |
| 2019/0061954 | A1 * | 2/2019 | Miedema | B60N 3/002 |
| 2020/0017220 | A1 * | 1/2020 | Wanner | B64D 11/0636 |
| 2021/0039793 | A1 * | 2/2021 | Vipula | B64D 11/00155 |
| 2022/0234739 | A1 * | 7/2022 | Morales Morales | B60R 11/0241 |
| 2022/0289084 | A1 * | 9/2022 | Fitzpatrick | B60N 3/004 |
| 2023/0021943 | A1 * | 1/2023 | Ketels | B60R 11/02 |
| 2023/0182632 | A1 * | 6/2023 | Mansouri | F16M 11/10<br>297/163 |
| 2023/0373630 | A1 * | 11/2023 | Billon | B60N 3/002 |
| 2025/0121939 | A1 * | 4/2025 | Harris | B64D 11/00152 |
| 2025/0136005 | A1 * | 5/2025 | Chen | B60R 7/06 |
| 2026/0028123 | A1 * | 1/2026 | Johnson | B64D 11/0638 |

FOREIGN PATENT DOCUMENTS

| | | |
|---|---|---|
| WO | 2017147620 | 8/2017 |
| WO | 2020039237 | 2/2020 |

* cited by examiner

TRAY TABLE WITH ELECTRONIC DEVICE POSITIONING APPARATUS

CROSS-REFERENCE TO RELATED APPLICATIONS

This application claims priority to EP Patent Application No. 23202974.4, filed Oct. 11, 2023 and titled "TRAY TABLE WITH ELECTRONIC DEVICE POSITIONING APPARATUS," which is incorporated by reference herein in its entirety for all purposes.

FIELD

The present disclosure relates generally to a tray table (e.g.) for an aircraft passenger seat comprising an apparatus for positioning an electronic device.

BACKGROUND

Airline passengers have evolved to carry more personal electronic devices, such as smart phones and tablet, and provide their own inflight entertainment via such personal electronic devices. The airline industry hasn't adapted to giving passengers a better in-flight experience by providing a dedicated somewhere for passengers to put their devices to view emails, movies, etc., during a flight. Traditional passenger tray tables don't allow for good ergonomics to watch a film unless passengers bring their own device supports.

It is therefore desired to provide improved means for supporting and positioning a passenger's personal electronic device during a flight.

SUMMARY

According to a first aspect there is provided a tray table for a passenger seat, the tray table having a main body defining a table surface. The tray table comprises a first member configured to slide relative to the main body between a first position and a second, extended position. The first member at least when in the second, extended position is configured to define a first rest for supporting a first portion of an electronic device. The tray table also comprises a second member configured to move relative to the main body between a first, stowed position and a second, extended position. In the second position the second member protrudes upwardly from the table surface of the main body to define a second rest for supporting a second portion of an electronic device. The first member and the second member, when in their respective second, extended positions, thus cooperate to support and position an electronic device.

The tray table provides simple and effective means for positioning an electronic device, e.g., and in particular, such that a screen of the device can be angled towards the passenger's eye-line at a desired viewing angle, without requiring the passenger to hold the electronic device. The tray table also allows the first and second members to be moved to stowed positions, so that the tray table provides the dual purpose of a (normal) table surface and an electronic device support.

The tray table may be a tray table that is designed for a passenger seat of an aircraft. The arrangement described above is particularly suited for this context, because the first and second members can be stowed away relative to the tray table when not in use, such that the tray table can be effectively stowed during aircraft take-off or landing, e.g. in the normal manner for an aircraft tray table. However, in principle, the tray table could find utility in other situations, in particular for other passenger vehicles, such as on-board a train.

For example, and in a typical use case, the first member may be configured to support a bottom of an electronic device (with the 'bottom' being defined based on the screen orientation) whereas the second member is configured to support a back of the electronic device, with the electronic device thus being supported at these two points (and in embodiments only at these two points).

Subject to the particular requirements of the present disclosure, the first and second members may be operable and configured to move relative to the tray table in any suitable and desired manner, e.g. so long as they can move between a respective stowed position and a respective extended position in which they can provide the electronic device support.

For example, the second member may be configured to pivot or rotate relative to the table surface between the first and second positions, whereas (as mentioned above) the first member is designed to slide relative to the main body. The first member may thus be referred to as a "slidable member" and the second member may be referred to as a "rotatable member". Other arrangements would however be possible.

In the first position the first member is in a stowed position and in the second position the first member is in a deployed position. Similarly, in the first position the second member is in a stowed position and in the second position the first member is in a deployed position.

The second member may be configured to only be retained in the first or second position. That is, the second member may be moveable only between two discrete positions. This provides simplicity in terms of deployment of the second member by the passenger, and the second position may be selected such that it is suitable for supporting a back of different types of electronic devices.

The second member and the first member may be configured to be moved manually between the first and second positions.

The main body may comprise a pocket configured to receive the second member in the first position such that the second member is substantially flush with the table surface when the second member is in the first position. The result of this is a flat table surface when the second member is in the first position, such that the table surface can be used to rest objects (for example food or drink) on it when the second member is stowed away in the first position.

The second member may be angled relative to the table surface when the second member is in the second position. The angle may be, for example, non-perpendicular, for example the second member may be configured to be angled towards the electronic device when in the second position, in order to provide a robust support for the electronic device.

The second member may be a flap, wherein a bottom end of the flap is pivotally attached to the main body and the flap is configured such that an upper edge of the flap contacts and supports a back of an electronic device in order to position the electronic device.

The first member may comprise an end portion comprising a flange for supporting a bottom of an electronic device. This provides extra supported for the bottom of the electronic device and ensures that the electronic device remains in position when supported by the first and second members.

The first position of the first member may be a stowed position in which an end portion of the first member is substantially flush with an end portion of the tray table, the stowed position being the position in which the first member is stored in a respective cavity of the main body. The end portion of the first member may be the portion which is furthest from the main body when the first member is in the extended position. When the first member is in the stowed position, the tray table is generally shaped as a conventional tray table which can be used to rest objects on.

The first member may comprise an or the end portion, and when the first member is in the first position the end portion is in contact with the main body and when the first member is in the second position the end portion is spaced from the main body. The end portion may be the portion of the first member furthest from the main body.

The second position of the first member may be a deployed position, the deployed position being a position in which the first member can be used to support an electronic device.

The first member may comprise two rods, and the end portion may be a beam joining the rods. The two rods are configured to be received in a or the cavity of the main body. In use, the two rods can slide into and out of the cavity in order to move the first member between the first and second positions. The beam may be used to support a bottom of the electronic device.

The first member may be operable to extend from the first position to multiple extended positions (one of which may be the second position) in order to support and position the electronic device at different angles. In the different extended positions, the first member is more or less extended out of (or spaced from) the main body. This affects the position of a bottom of the device relative to the second member, which affects the angle of the device. This allows the position of the electronic device to be adjusted depending on the passenger's needs. For example, a taller passenger may wish to have a more shallow angle of the electronic device such that a screen of the electronic device is close to perpendicular to the eyeline of the passenger. In an embodiment, the second member may be operable to slide continuously between a stowed position and a fully extended position in order to support and position the electronic device at a range of different angles. This provides even more flexibility in terms of positions of the electronic device. The first member may be moved and retained to and between any position between the stowed (or first position) and fully extended position. An extended position is defined as any position of the first member in which the first member is deployed from the stowed position, i.e. in which the first member has been slid out from the main body. In any extended position an end of the first member may be is spaced from the main body (by a greater or lesser extend).

The fully extended position may be a position in which an or the end portion of the first member is at its furthest possible position from the main body. The end portion may be a portion of the first member which is furthest from the main body.

The main body may comprise a cavity configured to receive a portion of the first member.

The first member may comprise two rods and a beam joining the rods, where the two rods are configured to be received the cavity. This provides a low-weight but robust arrangement for the first member, and the beam can be used to support a bottom of the electronic device. In such an arrangement, the cavity may comprise two cavities, each cavity being configured to receive a respective rod.

The first member may comprise a stop configured to abut against a stop in the cavity of the main body when the first member reaches a or the fully extended position. In embodiments, the stop may be a flange provided on an internal end of the first member.

The first member may be configured to slide into or out of a or the cavity which is formed in an end of the tray table closest to the passenger in use. This allows the electronic device to be positioned in a convenient and appropriate position for the user to view a screen of the electronic device, without (for example) taking up space laterally. This is particularly important in contexts where there is less space, for example on an aircraft or bus.

The main body may comprise a bushing disposed in a or the cavity, the first member being in sliding contact with the bushing. The bushing provides stability to the first member and allows the first member to slide effectively relative to the main body. A bushing is also relatively inexpensive and easy to assembly. A material of the bushing may be selected such that the bushing provides sufficient friction to the first member that the first member stays in a particular position, but not so much friction that the first member cannot be manually moved between positions by the passenger.

The second member may be hinged to the table surface of the main body. Where provided, the hinge may be provided in the pocket formed in the table surface. The second member may be hinged to a central portion of the table surface of the main body.

The tray table may further comprise a charging port for charging an electronic device, the charging port being provided in the main body of the tray table. The charging port may be connected, for example, to an electrical distribution system of the aircraft using any suitable wiring arrangement. Various arrangements would be possible in this regard.

There is also provided an apparatus comprising an aircraft passenger seat and a tray table according to any of the above, wherein the tray table is attached to the aircraft seat and is moveable between a stowed and deployed position relative to the aircraft seat, wherein the tray table is configured to operate as described above when the tray table is in the deployed position. The tray table is particularly well suited to an aircraft passenger seat, because the parts forming the tray table are simple to produce and are relatively lightweight compared with other modes of support. Furthermore, the first and second members of the tray table can be easily stowed (and will stay in their stowed positions) when the tray table is stowed during aircraft take-off or landing.

There is also provided a method of installing a tray table according to any of the above onto a passenger aircraft seat, the method comprising providing at least two arms of the tray table, and pivotally attaching the tray table to the aircraft via the at least two arms.

BRIEF DESCRIPTION OF THE DRAWINGS

Various embodiments will now be described, by way of example only, and with reference to the accompanying drawings in which.

DETAILED DESCRIPTION

Figure 1:
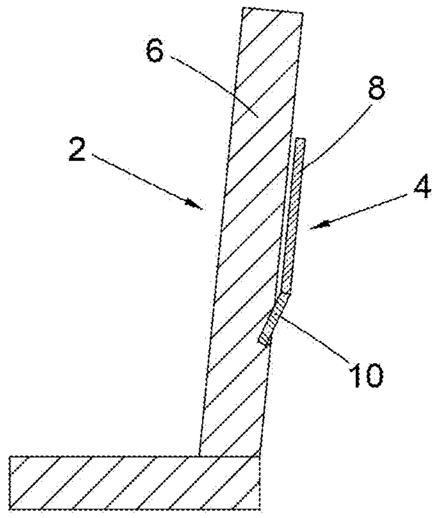
FIG. 1 shows a schematic side view of a passenger seat of an aircraft with a tray table in a stowed position.
Figure 2:
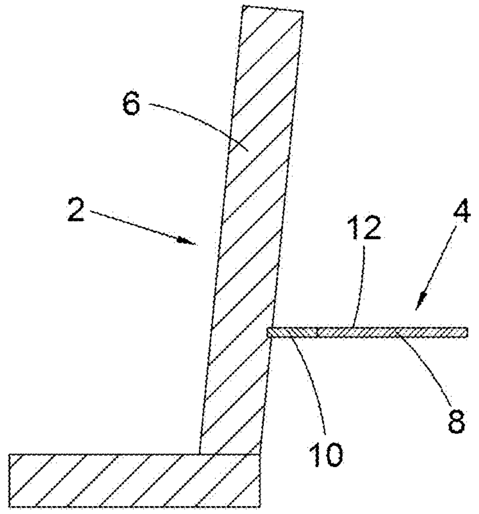
FIG. 2 shows a schematic side view of a passenger seat of an aircraft with a tray table in a deployed position.

FIGS. 1 and 2 illustrate a schematic cross-sectional side view of an aircraft passenger seat 2 and a tray table 4. FIG. 1 illustrates the tray table 4 in a stowed position, and FIG. 2 illustrates the tray table 4 in a deployed position. In the stowed position, the tray table 4 is folded up so that it is held against a back 6 of the seat 2. The tray table 4 may be retained in the stowed position using a rotatable clip (not shown). The tray table 4 comprises a main body 8 which provides an upper table surface 12. When the tray table 4 is deployed, the upper table surface 12 is generally horizontal and can be used by a passenger in a seat behind the one illustrated to rest objects on (for example food and drink). The tray table 4 further comprises two arms 10, where one end of each arm 10 is pivotally attached to the back 6 of the seat 2, and the opposite end of each arm 10 is pivotally attached to the main body 8 of the tray table 4. The arms 10 facilitate movement of the tray table 4 between the stowed and deployed positions.

Figure 3:
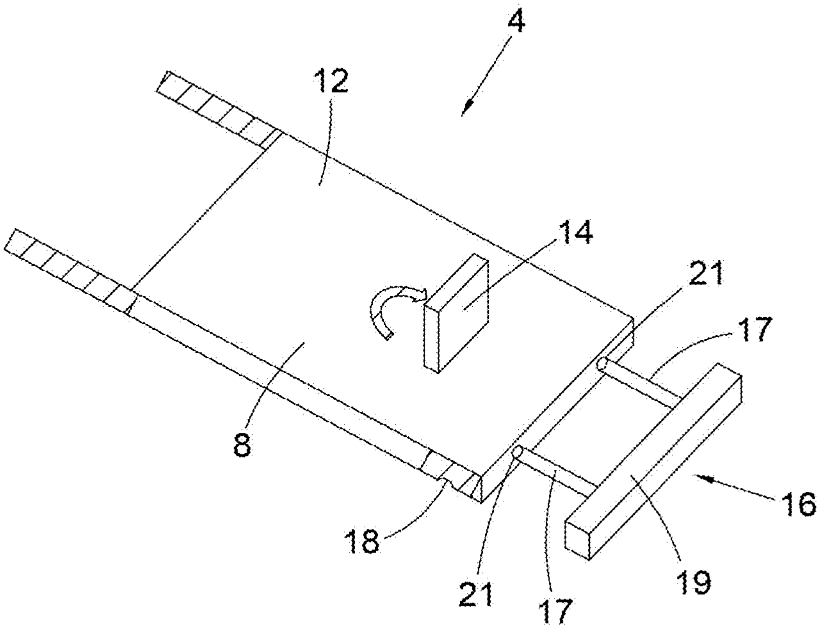
FIG. 3 shows a diagonal perspective view of an embodiment of the tray table shown in FIGS. 1 and 2.

FIG. 3 illustrates a diagonal perspective view of an embodiment of the tray table 4 shown in FIGS. 1 and 2. The tray table 4 comprises a rotatable member 14 configured to rotate relative to the main body 8, and a slidable member 16 configured to slide relative to the main body 8. As explained in more detail below, the rotatable member 14 and the slidable member 16 cooperate to provide a support for an electronic device (for example a smart phone or tablet). The tray table 4 further comprises a charging port 18 for charging an electronic device.

The rotatable member 14 is pivotally attached to the main body 8 and is configured to rotate between a stowed position (not shown) and a folded position (as illustrated in FIG. 3). In the stowed position, the rotatable member 14 is received in a pocket (not shown) in the upper table surface 12 of the main body 8 such that the rotatable member 14 is flush with the upper table surface 12. As shown in FIG. 3, when the rotatable member 14 is in a deployed position, the rotatable member 14 is angled relative to the upper table surface 12. The rotatable member 14 illustrated is in the form of a flap, which is generally flat and has a rectangular profile. However, other shapes for the rotatable member 14 are envisaged.

The slidable member 16 is configured to slide relative to the main body 8 between a stowed position (not shown) and an extended position, as illustrated in FIG. 3. The slidable member 16 comprises two rods 17 and end portion 19 in the form of a beam 19 connecting the ends of the rods 17. The rods 17 are elongate members which each extend into a respective bore 21 in the main body 8 of the tray table 4. In use, the rods 17 slide into our out of the bores 21 in order to move the beam 19 closer to or further away from the main body 8. The rods 17 are able to slide continuously within the bores 21 between a stowed position, in which the beam 19 contacts the main body 8, and a fully extended position, in which the beam 19 is at a maximum distance from the main body 8.

Figure 4:
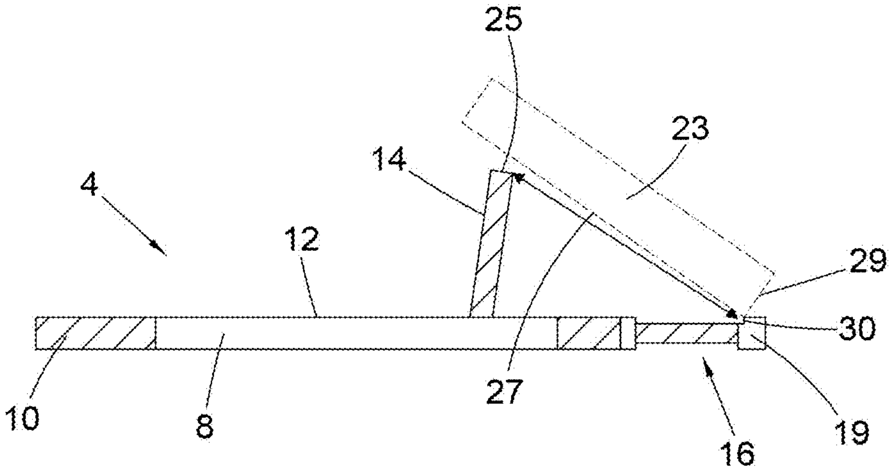
FIG. 4 shows a side view of the tray table of FIG. 3 and an electronic device being supported by the tray table.

FIG. 4 illustrates a side view of the tray table 4 of FIG. 3 and an electronic device 23 being supported by the tray table 4. As illustrated, a top 25 of the rotatable member supports a back 27 of the electronic device 23, and the beam 19 supports a bottom 29 of the electronic device 23. The beam 19 provides a lip 30 on which the bottom 29 of the electronic device 23 rests. This helps to prevent the electronic device 23 from slipping relative to the slidable member 16. In the illustrated example, the beam 19 of the slidable member 16 is positioned about halfway between the stowed position and the fully extended position.

Figure 5:
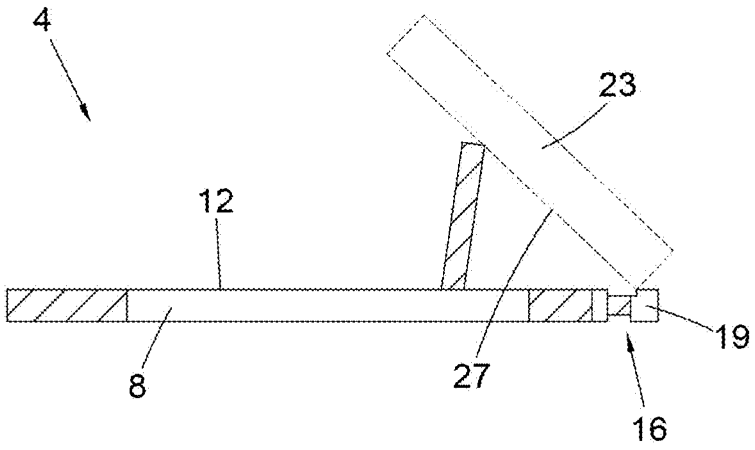
FIG. 5 shows a side view of the tray table and electronic device shown in FIG. 4, but with the slidable member in a less extended position to that shown in FIG. 4.

FIG. 5 illustrates a side view of the tray table 4 and electronic device 23 shown in FIG. 4, but with the slidable member 16 in a less extended position to that shown in FIG. 4, such that the beam 19 is closer to (albeit not in contact with, i.e. not yet fully stowed) the main body 8. As can be seen, the angle between the back 27 of the electronic device 23 and the top table surface 12 of the main body 8 is larger than the positioning shown in FIG. 4.

Figure 6:
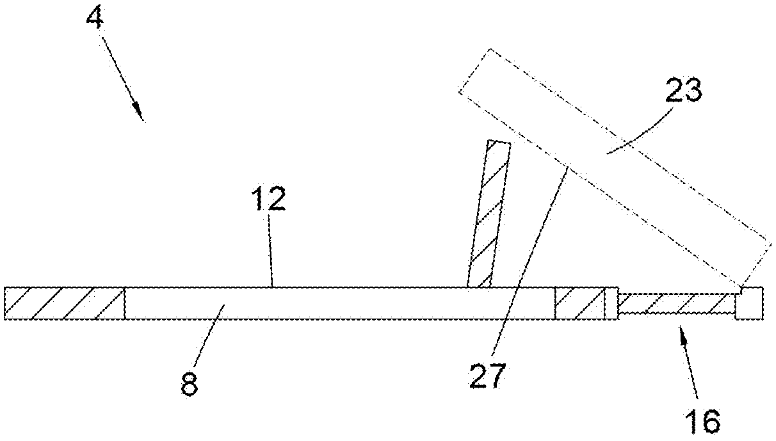
FIG. 6 shows a side view of the tray table and electronic device shown in FIGS. 4 and 5, but with the slidable member in a fully extended position.

FIG. 6 illustrates a side view of the tray table 4 and electronic device 23 shown in FIGS. 4 and 5, but with the slidable member 16 in a fully extended position. As shown, the angle between the back 27 of the electronic device 23 and the top table surface 12 of the main body 8 is smaller than the positions shown in FIGS. 4 and 5.

FIGS. 4 to 6 serve to illustrate that the position of the slidable member 16 can be adjusted to achieve different angles of the electronic device 23 relative to the main body 8 of the tray table 4. This can improve the user experience, because the user can choose an angle of the electrical device which is most comfortable to them (for example, depending on the height of the user).

Figure 7:
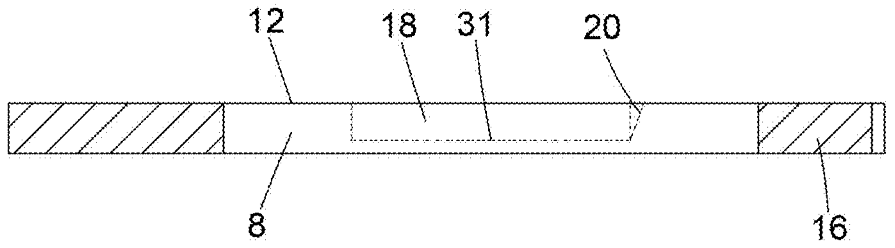
FIG. 7 shows a cross-sectional side view of the main body of the tray table illustrated in FIGS. 1 to 6.
Figure 8:
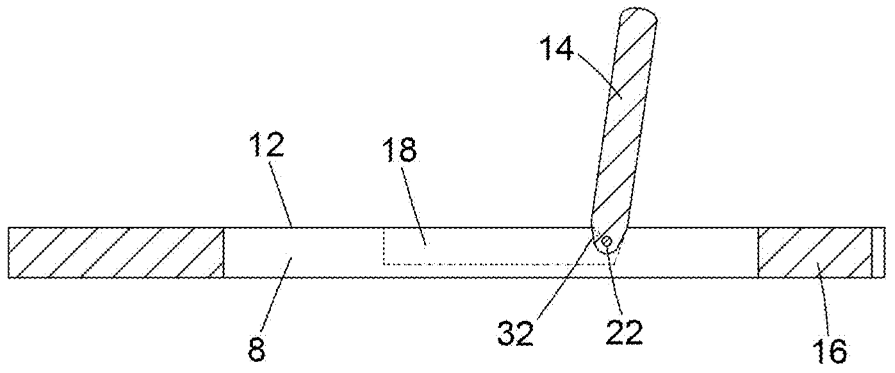
FIG. 8 illustrates a cross sectional side view of the main body shown in FIG. 7 and an embodiment of a rotatable member, which is shown in a deployed position.

FIG. 7 illustrates a cross-sectional side view of the main body 8 of the tray table 4. As mentioned above, the main body 4 comprises a pocket 18 for receiving the rotatable member when the rotatable member is in the stowed position. The pocket 18 is sized to complement the shape of the rotatable member such that the rotatable member can be fully received in the pocket 18 and flush with the top table surface 12 of the main body 8. As illustrated, a side surface 20 of the pocket 18 adjacent to the pivot axis of the rotatable member is angled greater than 90 degrees relative to a bottom surface 31 of the pocket 18. As shown in FIG. 8, this side surface 20 can act to contact and support the rotatable member when the rotatable member is in the deployed position.

FIG. 8 illustrates a cross sectional side view of the main body 4 shown in FIG. 7 and an embodiment of a rotatable member 14, which is shown in a deployed position. In this embodiment, the axis of rotation 22 of the rotatable member 14 extends through an end portion 32 of the rotatable member 14. In the illustrated embodiment, the end portion 32 is radiused, which helps to allow the rotatable member 14 to rotate between the stowed and deployed position within the pocket 18. As illustrated, when the rotatable member 14 is in the deployed position, the angled side surface 20 of the pocket 18 is in contact with a surface of the rotatable member 14 such that the rotatable member 14 extends along and at the same angle as the angled surface 20. This means that the rotatable member 14 is angled towards the slidable member 16 when in the deployed position. Angling the rotatable member 14 towards the slidable member 16 means that an angle between the rotatable member 14 and the electronic device being supported can be closer to 90 degrees than if the rotatable member 14 were at a right angle relative to the top table surface 12, for example. The result of this is that the rotatable member 14 can more easily stay in its deployed position without inadvertently moving to the stowed position.

Figure 9:
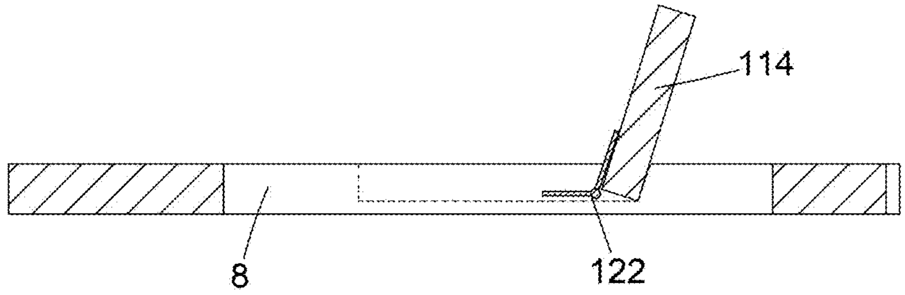
FIG. 9 illustrates a cross sectional side view of the main body shown in FIG. 7, and another embodiment of a rotatable member, which is shown in a deployed position.

FIG. 9 illustrates a cross sectional side view of the main body 8 shown in FIG. 7, and another embodiment of a rotatable member 114 (shown in a deployed position). This rotatable member 114 differs from that shown in FIG. 8 in that the axis of rotation 122 of the rotatable member 114 is provided adjacent to a corner of the rotatable member 114. This placement of the axis of rotation 122 allows space for the rotatable member 114 to rotate between the stowed and deployed position without the need for a radiused end portion of the rotatable member 114.

Figure 10:
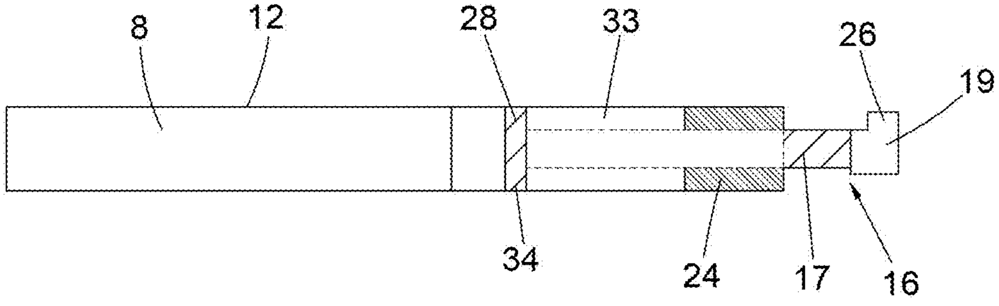
FIG. 10 illustrates a cross-sectional side view of an embodiment of a main body and a slidable member, the cross section taken along one of the rods of the slidable member.

FIG. 10 illustrates a cross-sectional side view of an embodiment of a main body 8 and slidable member 16, the cross section taken along one of the rods 17 of the slidable member 16. The slidable member 16 is shown in a deployed position, with the beam 19 positioned between the stowed and fully extended position. As explained above, the main body 8 includes a respective cavity 33 for each rod 17 of the slidable member 16. The main body 8 includes a bushing 24 within the illustrated cavity 33. The bushing 24 surrounds and is in sliding contact with the rod 17. The materials of the rod 17 and the bushing 24 are selected to provide sufficient friction that the sliding member 16 stays in a particular position during use, but not so much friction that the user cannot easily manually move the slidable member 16 between different positions. At an internal end of the rod 17 there is provided a stop 28 which provides a flange 34. The flange 34 contacts the bushing 24 when the slidable member 16 is in the fully extended position, thereby preventing further extension of the slidable member 16.

Figure 11:
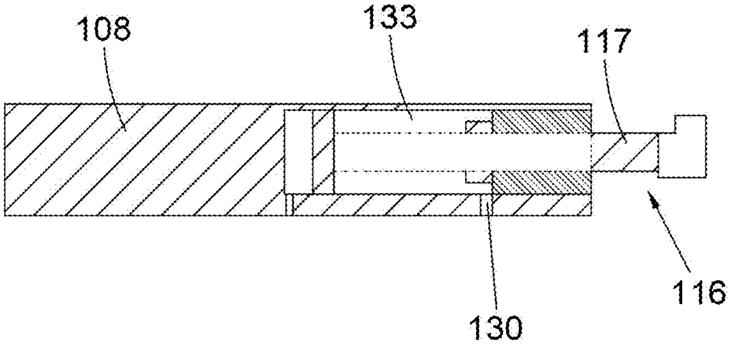
FIG. 11 illustrates a cross-sectional side view of another embodiment of a main body and slidable member.

FIG. 11 illustrates a cross-sectional side view of another embodiment of a main body 108 and slidable member 116. This embodiment is similar to the embodiment illustrated in FIG. 10, except that in this embodiment there are air vents 130 provided in the bottom of the main body 108 to allow air to enter or exit the cavity 133 containing the rod 117. This helps to provide smooth movement of the slidable member 116.

Figure 12:
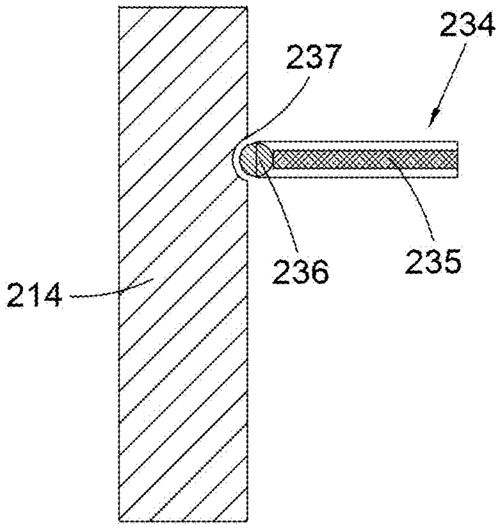
FIG. 12 illustrates a schematic illustration of an embodiment of a rotatable member and a strut for propping up the rotatable member.

FIG. 12 illustrates a schematic illustration of an embodiment of a rotatable member 214 and a strut 234 for propping up the rotatable member 214. The strut 234 is pivotally attached to the main body of the tray table, and can be lifted by a user and placed under the rotatable member 214 in order to retain the rotatable member 214 in the deployed position. The strut 234 comprises a hollow cylinder which includes a spring 235 and a ball bearing 236 attached to an end of the spring 235. The rotatable member 214 has an indentation 237 which receives the ball bearing 236 when the strut 234 is placed under the rotatable member 214 in the deployed position. If excessive force is applied to the rotatable member 214, the ball bearing 236 will be pushed into the hollow cylinder of the strut 234 (against the force of the spring), and the strut 234 will fall into a stowed position (folded into the pocket of the main body). This prevents the rotatable member 214 or the strut 234 from breaking in use.

Figure 13:
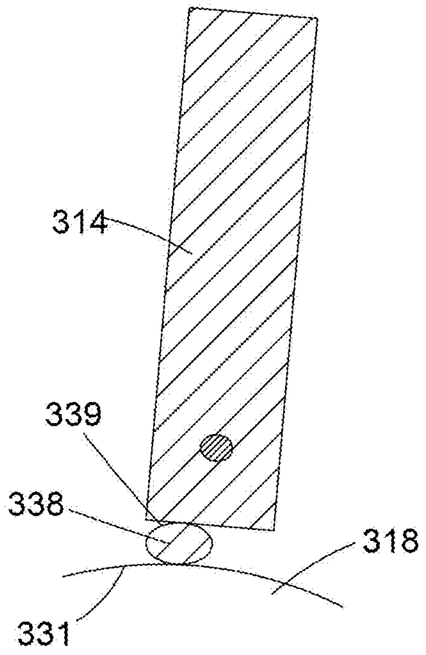
FIG. 13 shows a schematic illustration of another embodiment of a rotatable member and a portion of the pocket of the main body.

FIG. 13 shows a schematic illustration of another embodiment of a rotatable member 314 and a portion of the pocket 318 of the main body. As shown, the rotatable member 314 provides a cam follower 338 attached to a bottom surface 339 of the rotatable member 314, and a portion of the bottom surface 331 of the pocket 318 provides a cam surface. As the rotatable member 314 rotates from the stowed position towards the deployed position, the cam follower 338 on the rotatable member 314 will become wedged against the cammed surface 331. This acts to retain the rotatable member 314 in the deployed position. In order to move the rotatable member 314 from the deployed position to the stowed position, the user can push the rotatable member 314 towards its stowed position, where the force applied by the user can overcome the friction between the cam follower 338 and the cam surface 331 thereby freeing the rotatable member 314 from its deployed position.

Figure 14:
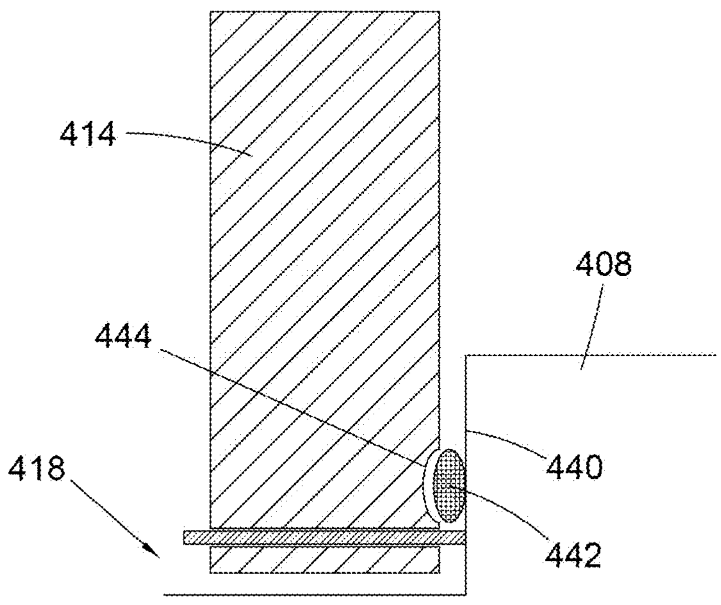
FIG. 14 shows a schematic illustration of another embodiment of a rotatable member and a portion of the main body.

FIG. 14 shows a schematic illustration of another embodiment of a rotatable member 414 and a portion of the main body 408. In this embodiment, a surface 440 of the pocket 418 of the main body 408 provides a protruding feature 442, and an adjacent portion of the rotatable member 414 provides a corresponding groove 444. When the rotatable member 414 reaches the deployed position, the protruding feature 442 will snap into the corresponding groove 444 in order to retain the rotatable member 414 in the deployed position.

Figure 15:
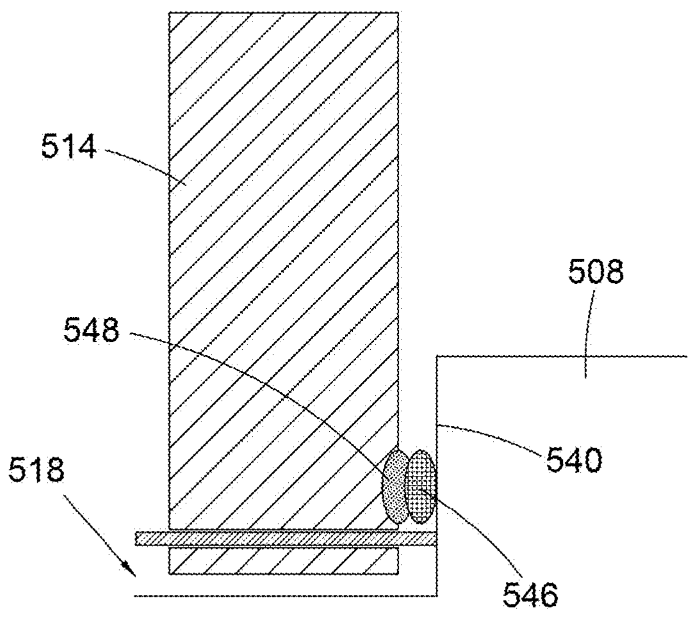
FIG. 15 shows a schematic illustration of yet another embodiment of a rotatable member and a portion of the main body.

FIG. 15 shows a schematic illustration of another embodiment of a rotatable member 514 and a portion of the main body 508. In this embodiment, a surface 540 of the pocket 518 provides a protruding feature 546 and an adjacent portion of the rotatable member also provides a protruding feature 548. When the rotatable member 514 reaches the deployed position, the protruding feature 548 of the rotatable member 514 becomes wedged with the protruding feature 546 of the main body 508 in order to retain the rotatable member 514 in the deployed position.

Although a tray table has been described above with reference to various embodiments, it will be understood by those skilled in the art that various changes in form and detail may be made without departing from the scope of the invention as set forth in the accompanying claims.

What is claimed is:

1. A tray table for a passenger seat, the tray table having a main body defining a table surface, and the tray table comprising:

a first member comprising two rods and an end portion in the form of a beam connecting ends of the rods, the first member configured to slide relative to the main body between a first position and a second, extended position, the two rods configured to slide continuously within respective bores in the main body between the first position and a fully extended position, wherein at least when in the second, extended position the first member is configured to define a first rest for supporting a first portion of an electronic device; and a second member configured to move relative to the main body between a first, stowed position and a second, extended position, wherein in the second position the second member protrudes upwardly from the table surface of the main body to define a second rest for supporting a second portion of an electronic device, wherein the first member and the second member, when in their respective second, extended positions, cooperate to support and position an electronic device such that the beam of the first member supports a bottom of the electronic device and the second member supports a back of the electronic device, enabling an angle of the electronic device relative to the table surface to be adjusted based on a position of the first member.

2. The tray table of claim 1, wherein the main body comprises a pocket configured to receive the second member in the first position such that the second member is substantially flush with the table surface when the second member is in the first position.

3. The tray table of claim 1, wherein the second member is angled relative to the table surface when the second member is in the second position.

4. The tray table of claim 1, wherein the beam comprises a flange for supporting a bottom of an electronic device.

5. The tray table of claim 1, wherein the first position of the first member is a stowed position in which the beam of the first member is substantially flush with an end portion of the tray table, the stowed position being the position in which the two rods are stored in the respective bores of the main body.

6. The tray table of claim 5, wherein the first member comprises a stop configured to abut against a stop in one of the respective bores of the main body when the first member reaches the fully extended position.

7. The tray table of claim 1, wherein the first member is operable to extend to multiple different positions in order to support and position the electronic device at different angles.

8. The tray table of claim 1, wherein the two rods are configured to slide into or out the respective bores, which are formed in an end of the tray table closest to the passenger in use.

9. The tray table of claim 1, wherein the main body comprises a bushing disposed in at least one of the bores, at least one of the two rods being in sliding contact with the bushing.

10. The tray table of claim 1, wherein the second member is hinged to the table surface of the main body.

11. The tray table of claim 1, further comprising a charging port for charging an electronic device, the charging port being provided in the main body of the tray table.

12. An apparatus comprising:

an aircraft passenger seat; and the tray table of claim 1, wherein the tray table is attached to the aircraft seat and is moveable between a stowed and deployed position relative to the aircraft seat, wherein the tray table is configured to operate as described above when the tray table is in the deployed position.

13. A method of installing the tray table of claim 1 onto a passenger aircraft seat, the method comprising providing at least two arms of the tray table, and pivotally attaching the tray table to the aircraft via the at least two arms.

14. The tray table of claim 1, wherein the second member is a flap, wherein a bottom end of the flap is pivotally attached to the main body and the flap is configured such that an upper edge of the flap contacts and supports a back of the electronic device in order to position the electronic device.

15. The tray table of claim 1, wherein the main body comprises a pocket configured to receive the second member in the first position, the pocket comprising a side surface adjacent to a pivot axis of the second member that is angled greater than 90 degrees relative to a bottom surface of the pocket, wherein when the second member is in the second position, the angled side surface contacts and supports the second member such that the second member extends at the same angle as the angled side surface.

16. The tray table of claim 1, wherein the main body comprises air vents provided in a bottom of the main body to allow air to enter or exit the bores containing the two rods, the air vents configured to provide smooth movement of the first member.

17. The tray table of claim 1, further comprising a strut pivotally attached to the main body, wherein the strut is configured to be lifted by a user and placed under the second member in order to retain the second member in the second position, the strut comprising a hollow cylinder including a spring and a ball bearing attached to an end of the spring, and the second member comprising an indentation configured to receive the ball bearing when the strut is placed under the second member.

18. The tray table of claim 1, wherein the second member comprises a cam follower attached to a bottom surface of the second member, and a bottom surface of a pocket in the main body provides a cam surface, wherein as the second member rotates from the first position towards the second position, the cam follower becomes wedged against the cam surface to retain the second member in the second position.

19. The tray table of claim 1, wherein a surface of a pocket in the main body provides a protruding feature, and an adjacent portion of the second member provides a corresponding groove, wherein when the second member reaches the second position, the protruding feature snaps into the corresponding groove to retain the second member in the second position.

20. The tray table of claim 1, wherein the beam comprises a lip on which a bottom of the electronic device rests, the lip configured to prevent the electronic device from slipping relative to the first member.

* * * * *